May 2, 1967  A. LEGER  3,316,604

HOOD CLAMP

Filed June 29, 1964

INVENTOR
ALTON LEGER

BY
ATTORNEYS

United States Patent Office 3,316,604
Patented May 2, 1967

3,316,604
HOOD CLAMP
Alton Leger, P.O. Box 135, Grand Coteau, La. 70541
Filed June 29, 1964, Ser. No. 378,528
2 Claims. (Cl. 24—263)

This invention relates to devices applicable to relatively movable structural elements for maintaining the latter in a definite fixed position or relation as long as the devices are in place and including structural elements which form a part of automobiles or other structures.

The invention relates particularly to a hood clamp for maintaining the hood or closure member over an automobile engine in an elevated position so that access may be had thereto without danger of it accidentally falling with likelihood of causing injury to a mechanic, serviceman, or other person having access beneath the hood for whatever purposes necessary.

Hoods on automobiles are supported by hinges provided with springs for maintaining the parts of such hinges in fixed relation and such hoods in elevated positions; but these springs are relatively weak and readily allow the hoods to fall, sometimes injuring a mechanic or other person working beneath the same on the vehicle and making it desirable to have some reliable means for preventing accidental falling or lowering of the hood. In order to avoid mishaps which have occurred due to the fact that hoods have accidentally dropped or moved downwardly causing injury, overhead clamps have been provided, but these have involved either the moving of the vehicle being worked upon, or in the waste of time in adjusting such clamps, and certain of these clamps have been of a construction that the hood could be closed without removing the clamp with the resultant carrying away and loss of the clamp.

It is the object of the invention to provide a relatively simple and inexpensive hood clamp capable of being applied onto the spring-leaf structure of the hood, as well as a hood clamp including a specific adapter to be applied when the spring leaves are off-set as on many automobiles, such adapter being designed to accommodate any off-set from the line of motion of the shaft of this invention.

Another object of the invention is to provide a hood clamp capable of being produced of readily available parts of a construction to be easily applied and removed, and which when applied will positively and satisfactorily maintain a hood in a raised position so that it cannot fall or be lowered until the clamp is removed, thereby reducing the possibility of the clamp being carried away by oversight.

Figure 1:
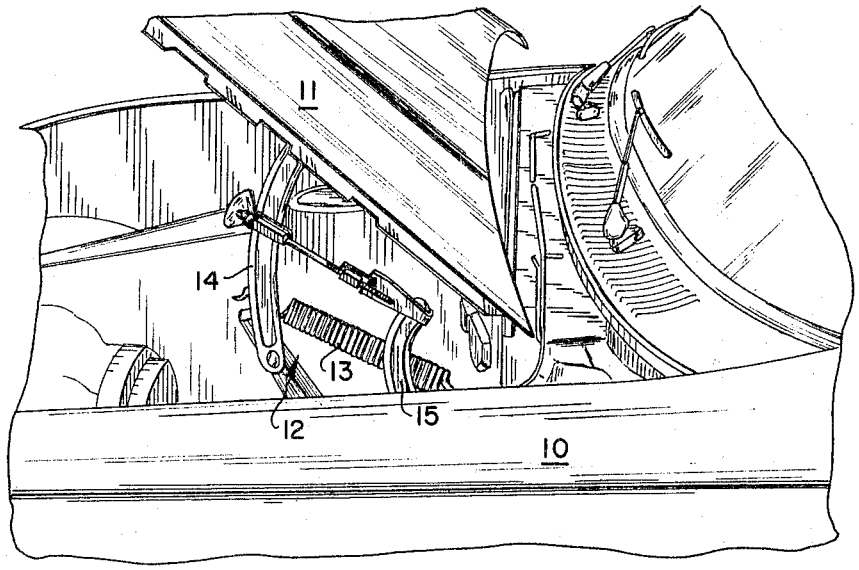
Figure 2:
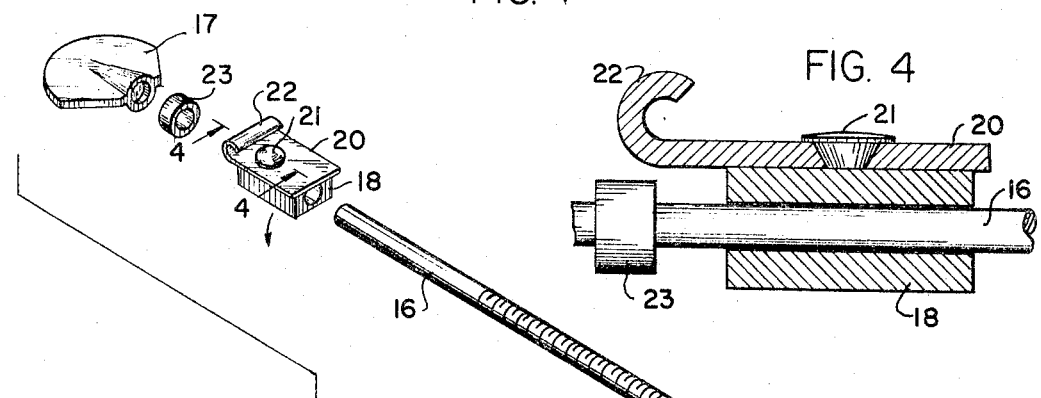
Figure 3:
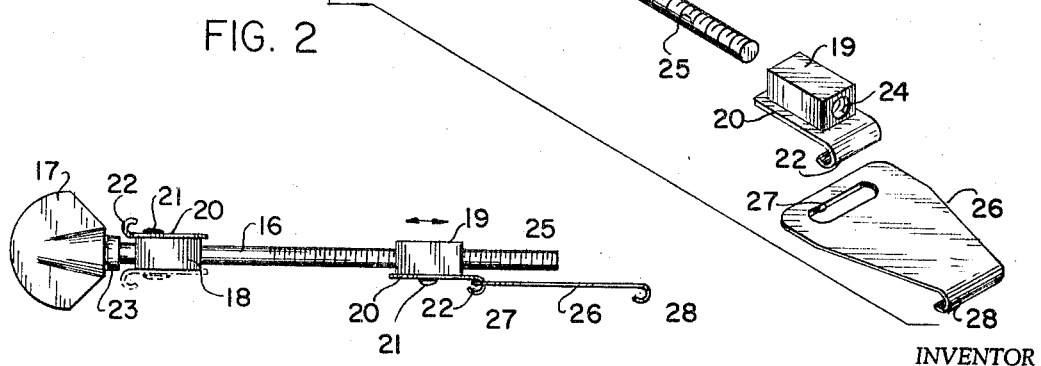

Other objects and advantages of the invention will be apparent from the following description considered in conjunction with the accompanying drawing, wherein:

FIG. 1 is a perspective illustrating one application of the invention for maintaining the hood of an automobile in a fixed raised position;

FIG. 2, an enlarged exploded perspective of the clamp itself;

FIG. 3, a side elevation of the clamp; and

Figure 4:
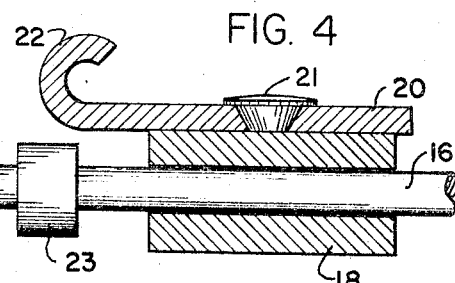

FIG. 4, a section viewed on the line 4—4 of FIG. 2.

Briefly stated, the invention is a hood clamp comprising a shaft having an abutment fixed at one end, a rotatable hook on said shaft in contact with said abutment, the opposite end of said shaft being threaded for reception of another hook-carrying member whereby the spaced hooks on the shaft may be engaged over opposite portions of spaced hinge lever members which are constructed to move apart to prevent the hood from lowering and which lever members, when the hood is raised, are maintained in a spaced relation by means of a coiled spring, the said clamp being readily adjustable and applicable positively to retain the levers against separation and the hood from readily lowering or falling.

With continued reference to the drawing, an automobile 10 is provided with a hood 11, mounted by means of a hood hinge 12 at each side permitting raising and lowering of the hood.

A coiled spring 13 is employed to maintain levers or hinge members 14 and 15 in a position in which they are closer together while the hood is raised and which move apart as the hood is lowered. The spring 13 is only strong enough to maintain the levers 14 and 15 in closer proximity when the hood is fully raised, and consequently the weight of the hood or other slight cause sometimes allows the hood to move downwardly or fall. At times a mechanic working beneath the hood is injured by the hood accidentally falling and the present invention is designed to avoid such accidents.

The hood clamp of the present invention comprises a shaft 16 welded or otherwise fixed at one end to a wing member 17 by means of which the shaft 16 can be rotated. A pair of blocks 18 and 19 have a pair of plates 20 attached by rivets 21 thereto, each plate having a reversely-bent, hook-forming portion 22 designed to hook over or about one of the members 14 and 15.

The block 18 is freely slidable and rotatable on the threaded portion of the shaft 16 against a thrust-bearing 23 which bears against a wing member 17. The block 19 is provided with internal threads 24 which engagingly receive the threads 25 on the shaft 16.

In applying the clamp of this invention, the hook 22 carried by the block 19 threaded to the shaft 16 is engaged or hooked over the hinge-lever member 15, and the hook 22 on the block 18 is engaged or hooked about the hinge-lever member 14. Thereafter, the wing member 17 is manipulated to rotate the shaft 16 with its threaded portion 25 relative to the block 19 to obtain the proper adjustment to hold the members 14 and 15 in a fixed relation with the hood raised, thus implementing the action of the coiled spring 13.

In the event that there is a slight off-set in the hinge leaves, a specific adapter 26 is provided in the form of a plate, having a slot 27 in one end portion of a size to receive the hook 22 and with the other end having a hook 28, subsantially the size of the hook 22.

It will be apparent from the foregoing that a simple emergency hood clamp is provided which can be readily applied, adjusted and tightened to perform the function for which it was designed, and which positively will retain the parts in a definite relation with the hood raised and held raised against accidental falling or lowering.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A hood clamp applicable to the supporting members of an automobile engine hood comprising a shaft having a smooth cylindrical portion and a threaded portion, manually operable means on one end of said shaft for rotating the same, a pair of blocks mounted on said shaft, one of said blocks having a relatively smooth cylindrical opening slidably receiving the smooth portion of said shaft, the other block having a threaded opening complementary to the threads on said shaft, each block having a generally flat surface located substantially parallel to the axis of said shaft, a flat plate having a hooked end attached to the flat surface of each block, and said hooked ends being arranged to face each other, whereby said hooked ends can be caused to engage the supporting members of the hood to maintain said hood in open position.

2. A clamp for the hood of an automobile comprising a shaft having a threaded portion, manually operable means fixed to one end of said shaft, a pair of blocks mounted on said shaft, one of said blocks having a relatively smooth cylindrical opening slidably receiving said shaft, the other block having a threaded opening complementary to the threads on said shaft, each block having a generally flat surface located substantially parallel to the axis of said shaft, a flat plate with a hooked end attached to the flat surface of each block, and said hooked ends being arranged to face each other, whereby said hooked ends can be applied to the hood supports of an automobile to maintain the hood in open position.

References Cited by the Examiner

UNITED STATES PATENTS

| | | | |
|---|---|---|---|
| 1,586,061 | 1/1926 | Barton | 24—263.3 |
| 2,341,048 | 2/1942 | Kopp | 248—226.2 |
| 3,114,530 | 12/1963 | Shilling | 248—226 |

EDWARD C. ALLEN, *Primary Examiner.*

BOBBY R. GAY, *Examiner.*

D. L. TROUTMAN, *Assistant Examiner.*